(12) United States Patent
Vetsch et al.

(10) Patent No.: US 12,025,799 B2
(45) Date of Patent: Jul. 2, 2024

(54) HEAD-UP DISPLAY SYSTEM

(71) Applicant: Continental Automotive GmbH, Hannover (DE)

(72) Inventors: Eugen Vetsch, Nauheim (DE); Thomas Schaper, Schaafheim (DE); Yilmaz Efe, Griesheim (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/886,148

(22) Filed: May 28, 2020

(65) Prior Publication Data
US 2020/0292815 A1 Sep. 17, 2020

Related U.S. Application Data

(63) Continuation of application No. PCT/EP2018/081287, filed on Nov. 15, 2018.

(30) Foreign Application Priority Data

Nov. 30, 2017 (DE) ...................... 10 2017 221 531.3

(51) Int. Cl.
| | |
|---|---|
| *G02B 27/01* | (2006.01) |
| *B60K 35/00* | (2006.01) |
| *B60R 11/00* | (2006.01) |
| *B60R 11/02* | (2006.01) |
| *B60K 35/23* | (2024.01) |

(52) U.S. Cl.
CPC ..... *G02B 27/0149* (2013.01); *G02B 27/0101* (2013.01); *B60K 35/00* (2013.01); *B60K 35/23* (2024.01); *B60R 2011/0012* (2013.01); *B60R 11/0229* (2013.01); *G02B 2027/011* (2013.01); *G02B 2027/0169* (2013.01)

(58) Field of Classification Search
CPC ... G02B 27/01–0189; G02B 2027/0105–0198; G02B 27/00–648; B60K 2370/00–98; B64D 11/064; B60R 2011/0001–0294; B60R 11/00–06
See application file for complete search history.

(56) References Cited

U.S. PATENT DOCUMENTS

| | | |
|---|---|---|
| 4,908,611 A | 3/1990 | Iino |
| 2016/0263970 A1 | 9/2016 | Tamaoki |
| 2017/0160551 A1* | 6/2017 | Azuma ................... H05B 3/84 |

(Continued)

FOREIGN PATENT DOCUMENTS

| | | |
|---|---|---|
| CN | 203958001 U | 11/2014 |
| DE | 10226451 C1 | 7/2003 |

(Continued)

OTHER PUBLICATIONS

Office Action dated Aug. 17, 2018 from corresponding German Patent Application No. DE 10 2017 221 531.1.

(Continued)

*Primary Examiner* — Bao-Luan Q Le
*Assistant Examiner* — Christopher A Lamb, II

(57) ABSTRACT

The present invention relates to a head-up display system having a partially reflecting transparent pane with a region of nearly uniform curvature, a head-up display unit, and a vehicle seat. The head-up display unit is arranged according to the invention at the vehicle seat.

7 Claims, 3 Drawing Sheets

(56) References Cited

U.S. PATENT DOCUMENTS

2018/0254001 A1* 9/2018 Koren .................. G06Q 50/01
2019/0077313 A1* 3/2019 Kanaguchi ............ G02F 1/1334

FOREIGN PATENT DOCUMENTS

| DE | 102005037797 A1 | 2/2007 | | |
|----|----|----|----|----|
| DE | 102007015877 A1 | 10/2008 | | |
| DE | 102015012626 A1 | 4/2017 | | |
| DE | 102015225068 A1 | 6/2017 | | |
| EP | 3032317 A1 | 6/2016 | | |
| JP | 2016168931 A | 9/2016 | | |
| WO | WO-2013190153 A1 | * | 12/2013 | ............ B60N 2/468 |
| WO | 2016089985 A1 | 6/2016 | | |
| WO | 2017067528 A1 | 4/2017 | | |

OTHER PUBLICATIONS

International Search Report and Written Opinion dated Feb. 13, 2019 from corresponding International Patent Application No. PCT/EP2018/081287.

* cited by examiner

HEAD-UP DISPLAY SYSTEM

CROSS REFERENCE TO RELATED APPLICATIONS

This U.S. patent application claims the benefit of PCT patent application Ser. No. PCT/EP2018/081287, filed Nov. 15, 2018, which claims the benefit of German patent application No. 10 2017 221 531.3, filed Nov. 30, 2017, both of which are hereby incorporated by reference.

TECHNICAL FIELD

The present invention relates to a head-up display system, in particular for a motor vehicle.

BACKGROUND

A head-up display system has a head-up display unit is arranged in the region of the vehicle ceiling and light beams are incident on a partially reflecting transparent pane located above the dashboard of a truck. The driver sitting on a vehicle seat always sees the display in the lower region of the windshield, and this display additionally appears to the driver as being arranged more or less high depending on the height adjustment of the vehicle seat owing to the viewing angle that changes during the adjustment.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A head-up display system has a partially reflecting transparent pane having a region of nearly uniform curvature. The head-up display system furthermore has a head-up display unit and a vehicle seat on which the head-up display unit is arranged. Therefore, the spatial region in which the eyes of the user must be located to be able to completely capture the display of the head-up display unit, the so-called eyebox, does not move, even in the case of a height adjustment or lateral adjustment of the vehicle seat, because the position of the head-up display unit is adjusted along with the vehicle seat. This is also the case for a variable height of the vehicle seat that occurs for example owing to suspension and any road unevennesses.

Owing to the uniform curvature of the pane in the region in which the beams produced by the head-up display unit are reflected, the distortion caused by the pane is also independent of the adjustment of the vehicle seat, and therefore an unchanged predistortion in the head-up display unit suffices to provide a display to the user that has as little distortion as possible.

The vehicle seat is for example the driver seat of a motor vehicle, aircraft, watercraft, or the like. The front passenger seat or the seat of another vehicle occupant can also be provided here. The partially reflecting transparent pane has a region of nearly uniform curvature. This region is used for reflecting the light beams coming from the head-up display unit. Owing to the uniform pane curvature, a uniform distortion is produced, independently of the partial region of the region of the nearly uniform curvature in which the reflection takes place.

The region of nearly uniform curvature can be completely planar or can have a constant curvature, or a curvature that changes spatially only slightly, in the horizontal and/or vertical direction. The partially reflecting transparent pane is the windshield of a vehicle or a so-called combiner pane arranged between the windshield and the head-up display unit.

The pane provided according to a variant is for example also the windowpane of a house, onto which AR information is overlaid using the head-up display unit. AR information is information that supplements or expands the reality, so-called augmented reality. In the case of a darkened or partially darkened pane, provision is made possible for a television image or the display of a computer, of a smartphone or of a similar device to be displayed.

A variant also makes provision for a pane that is mainly reflective and is not or almost not transparent. Therefore, for other persons, who are located outside the eyebox, the television image or the display is not visible. These other persons are therefore not disturbed by the television image or the display. Furthermore, the television image or the display is also not accessible to said other persons, which aids discretion. In this case, the vehicle seat should be considered to be the seat of the user, independently of whether the head-up display system is located in a vehicle. Rather than a driver seat, it is possible here for an office chair or a living room armchair to be provided.

The head-up display system is typically arranged in a vehicle, however, in which it is ensured that the angle between the user and the pane does not change or almost does not change. This is also the case in transport means such as aircraft or train, in which seats have a fixed angular position relative to one another with respect to a pane while being height-adjustable relative to one another. The pane in that case is for example a screen or a reflective area on the front seat.

There are many possible arrangements for the head-up display unit: in the lower region of the vehicle seat or at the height of the user's torso. The head-up display unit may be attached to a headrest of the vehicle seat. Therefore, the beam path extends approximately at head height of the user or slightly higher. In this region the beam path is unlikely to be interrupted by arm movements of the user because such movements generally occur in the region below it, for example when changing gear, when operating a radio, an air-conditioning system, when actuating an external-mirror adjustment means and in similar situations in which an arm movement takes place in the region of the beam path. This is the case, for example, when manually adjusting a rear-view mirror attached at the top. In such situations, the user concentrates on the relevant activity and less, or not at all, on the display of the head-up display system. The arrangement of the head-up display unit on the headrest, in particular when the partially reflecting transparent pane is almost perpendicular, results that no angle adjustment is required.

Furthermore, the head-up display unit has a "clear view" of the windshield or the combiner pane, past the driver's head and unimpaired by the driver's trunk or arms. If the headrest is height-adjustable, it is generally adapted individually to the user. This results in better adjustment of the head-up display unit arranged on the headrest than it is possible to achieve using the seat height adjustment alone. Additionally, if the user should have forgotten to correctly set the height of the headrest, the virtual image that is generated by the head-up display unit is not or only partially visible to the user. This is an at least indirect safety warning to correct the height adjustment of the headrest.

The head-up display unit may be attached to the vehicle seat by means of a fastening, wherein the fastening has a seat inclination compensator. Therefore, the eyebox does not move even when the inclination of the backrest or of the entire seat is adjusted. The fastening is integrated in the head-up display unit, or it is integrated in the vehicle seat, or it is a separate component.

The seat inclination compensator is, for example, a movable mirror of the head-up display unit, which is adapted to the seat inclination by way of a drive, so that the angle of reflection at the partially reflecting transparent pane remains unchanged. The seat inclination compensator adjusts the inclination of the relative angle between the head-up display unit and the vehicle seat by way of a mechanical drive. The drive can be driven directly by the user or be driven by a motor and/or automatically. In case the change in inclination of the vehicle seat is great, a height adjustment is also provided in the seat inclination compensator.

The head-up display unit may have an image distorter, which pre-distorts the image to be displayed in dependence on the adjustment of the vehicle seat. The predistortion is dependent here on the vertical adjustment and/or the horizontal adjustment and/or another adjustment, such as the adjustment of the inclination of the backrest. The predistortion provides that an undistorted reproduction is made possible even if the curvature of the partially reflecting transparent pane is not entirely uniform. According to an variant, the image distorter is an electronic unit which predistorts the image data to be represented, for example on the basis of one of a plurality of warping matrices which are retrievable from a memory. According to a further variant, the image distorter is a mirror of the head-up display unit, the mirror face of which is partially deformable, for example on the basis of a carrier material with a memory effect. According to a further variant, the image distorter is an optical pane of variable thickness, variable refractive index, or a variable hologram.

The invention makes provision for the head-up display system to be used in a vehicle and for the head-up display unit to be arranged on the side of the vehicle seat that faces the outside of the vehicle. Owing to the arrangement of the head-up display unit laterally with respect to the user's head, the virtual image generated by the head-up display unit appears slightly laterally offset to the user. If the head-up display unit is arranged at the vehicle seat not toward the center but rather toward the outside of the vehicle, this results in that the user has the virtual image, that is to say the display, in view even when casting a look to the side at the exterior mirror. The user will also often look in the direction of oncoming traffic, that is to say toward the outside of the vehicle. The display is consequently clearly in the user's view for a major part of the total driving time. If the head-up display unit is arranged by contrast toward the center of the vehicle, this provides that less predistortion is required because the windshield, which forms the partially reflecting transparent pane, has a lower and more uniform curvature in its central region than in one of its side regions.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
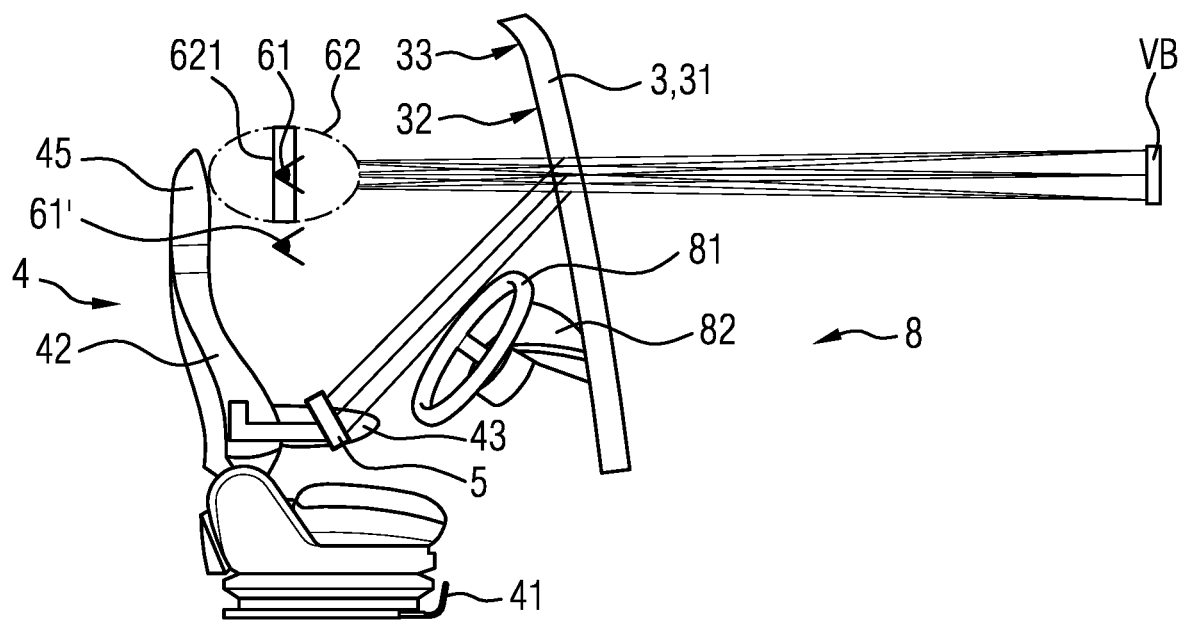
FIG. 1 shows a head-up display system according to the invention.

FIG. 1 shows a head-up display system. It has a partially reflecting transparent pane 3, which is illustrated here as a windshield 31 of a vehicle 8. It has a region 32 of nearly uniform curvature and a region 33 of variable curvature. The head-up display system furthermore has a vehicle seat 4, on which a head-up display unit 5 is arranged. The vehicle seat has a height adjustment device 41, a backrest 42, armrests 43, and a headrest 45. The vehicle 8 furthermore has a steering wheel 81 and a dashboard cover 82. Further parts of the vehicle 8 are not shown here for the sake of clarity.

In the variant shown here, the head-up display unit 5 is attached to the backrest 42 of the vehicle seat 4 by way of a fastening 44. The head-up display unit 5 generates light beams which are reflected at the windshield 31 and extend in the direction of the eye 61 of a user (not illustrated here). The user perceives a virtual image VB, which appears to be situated far in front of the windshield 31 outside the vehicle. The eye 61 is shown here at the center of the eyebox 62. The eyebox 62 is the region within which the eye must be located in order to be able to perceive the virtual image VB. In the section shown, the eyebox 62 has the shape of an ellipse. The central rectangular region 621 of the eyebox 62 is the region in which the eye 61 is optimally located. If a driver is very short, the eye 61' may be located outside the eyebox 62. In this case, a height adjustment must be performed. For example, the head-up display unit 5 is tilted slightly so that the beam path thereof is incident on the windshield 31 somewhat further down, is reflected from there, and reaches the eye 61'.

Figure 2:
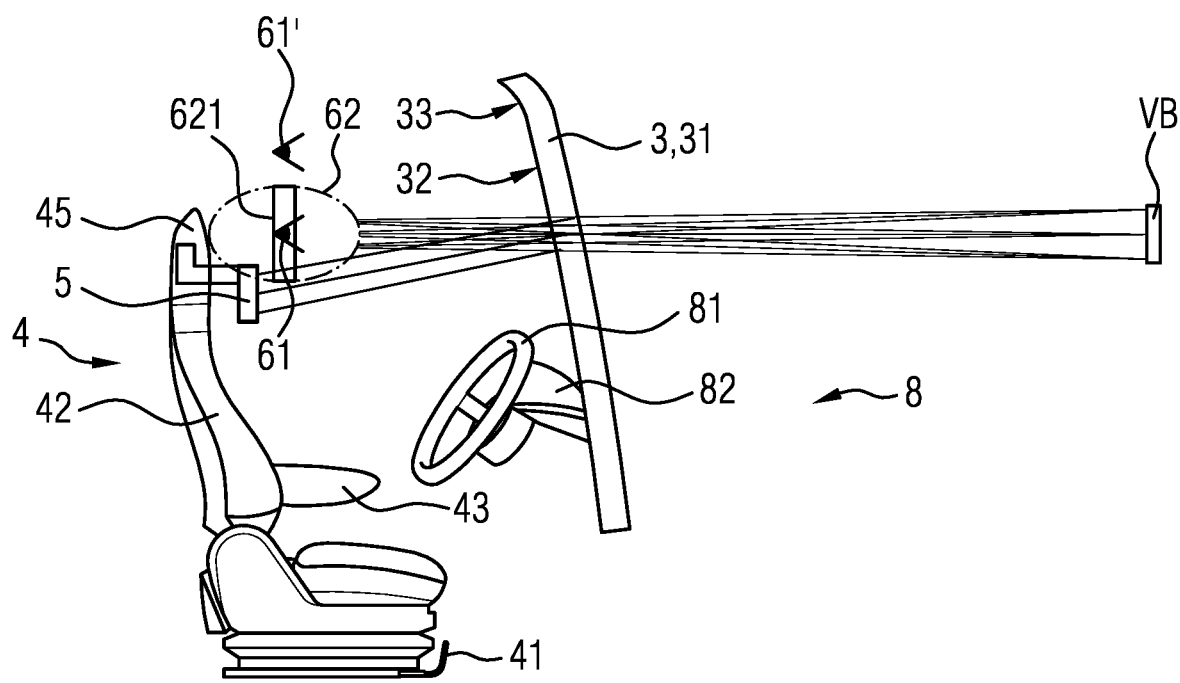
FIG. 2 shows a variant of a head-up display system.

FIG. 2 shows a variant of a head-up display system, in which the head-up display unit 5 is arranged on the headrest 45. It is evident that the angle of reflection of the beam path on the windshield 31 is more acute than in the previous illustration. The beam path is illustrated here as partially covering the eyebox 62. This illustrates that the optical unit 50 and thus the beam path are situated such that they are laterally displaced with respect to the headrest 45 (out of the plane of the drawing).

If the headrest 45 is height-adjustable and the user has set the headrest 45 too low, the eye 61' is located at the periphery or outside of the eyebox 62, as is illustrated here in exaggerated fashion. Since the eye 61' is located outside the eyebox 62, the user cannot see the virtual image VB. This is an indirect indication for the driver that the height of the headrest 45 has not been set correctly. For the correct adjustment of the headrest 45, a notice indicating an adjustment of the headrest up or down is shown if specific parts of the notice, for example three bars above and three bars below the text, are not or not completely visible. This makes correct adjustment of the height of the headrest 45 possible and thus increases safety.

Figure 3:
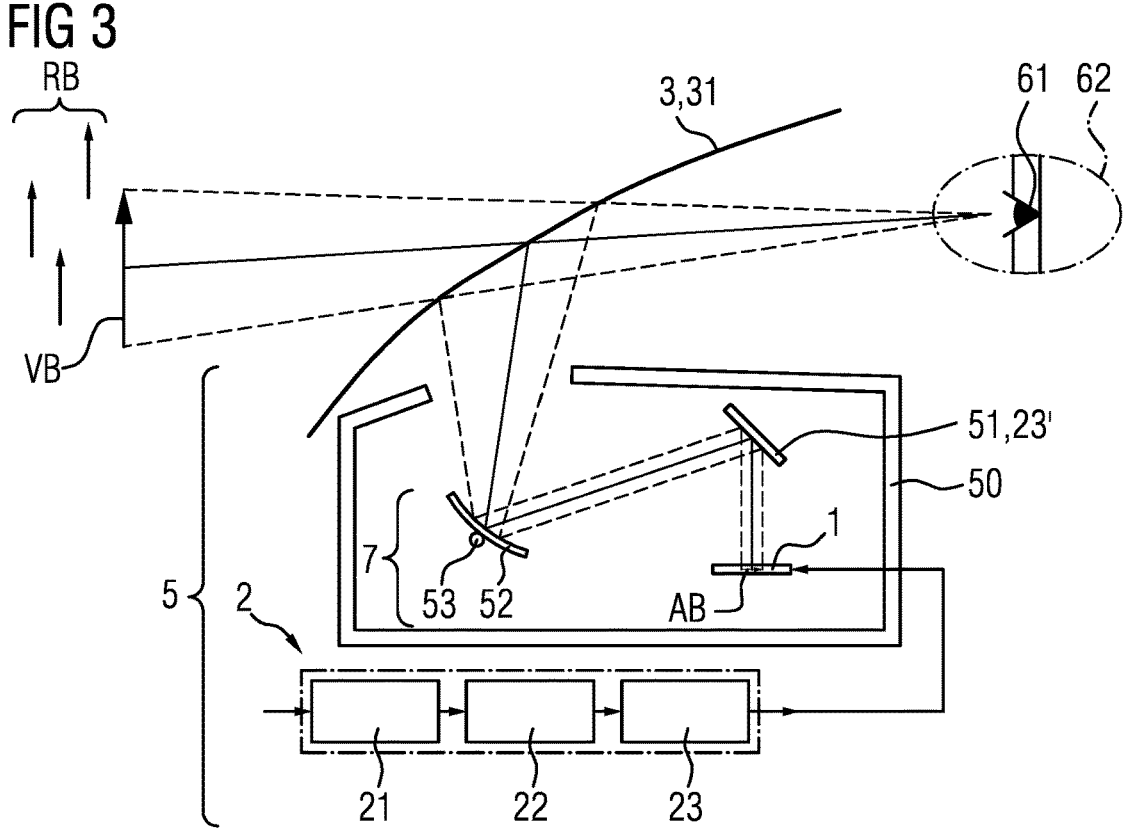
FIG. 3 shows a beam path in a head-up display system.

FIG. 3 shows the beam path in a head-up display system. The pane 3 is illustrated here with a greater inclination than in the previous illustrations and also has a greater but still uniform curvature. The eye 61 of a user, for example of the driver of a vehicle or of another user, is located at the center of the eyebox 62. The eye 61 sees a virtual image VB through the partially reflecting transparent pane 3, which is designed here as a windshield 31. The light beams that are incident on the eye 61 of the user were reflected at the windshield 31, which they reach coming from an optical unit 50 of the head-up display unit 5. The virtual image VB appears to the eye 61 of the observer to be overlaid on reality, the real image RB. The real image RB is here illustrated symbolically through three arrows, arranged spatially staggered and at different heights.

A display unit 1, which is illustrated here as a self-luminous flat display, for example an OLED display, is located in the optical unit 50. An image AB to be displayed is indicated on the display unit 1. From there, light reaches a plane mirror 51 from which it is reflected onto a movable mirror 52. The latter reflects it in the direction of the windshield 31, from whence it is reflected into the eye 61 of the observer. The movable mirror 52 is here shown to be rotatable about a pivot axis 53.

According to a variant, which is not illustrated, a rotation about an axis of rotation that is not parallel to the pivot axis 53 is also provided. The movable mirror 52 and the pivot axis 53 are elements of a variant of a seat inclination compensator 7. Owing to the rotation of the mirror 52, the region on the pane 3 in which the beams coming from the optical unit 5 are reflected moves, and thus the vertical position of the eyebox 62 moves such that the eye 61, which likewise assumes a different vertical position after a change in the seat inclination, is again located within the eyebox 62.

An image signal BS is supplied to the input side of an image generator 2, which is connected on the output side to the optical unit 50. The image generator 2 has a data processing unit 21, in which possibly complex data processing takes place. In the case of a head-up display system with augmented reality, this includes image recognition in a real image of the surroundings recorded by a camera so as to be able to assign appropriate additional data for the augmented reality to recognized image elements.

The collection and preparation of further information to be displayed is also part of the data processing carried out by the data processing unit 21. The processed data are supplied to a drawing unit 22 that draws the image to be represented. This is supplied to an image distorter 23, which carries out a predistortion in accordance with the curvature of the windshield 31 and also in accordance with further optical boundary conditions causing a distortion in the optical path between the display unit 1 and the eye 61.

According to a variant, the image distorter 23 accesses different warping matrices that are stored in a memory (not illustrated here). Depending on the adjustment of the seat, a warping matrix that is optimally adapted to the region of the windshield 31 at which the reflection takes place is used. Even a not entirely uniform curvature of the windshield 31 is thus compensated. The predistorted image signal is supplied to the optical unit 50. According to a further variant, the mirror 51 is provided as an image distorter 23'. It is able here to be controlled mechanically or electrically and changes its shape slightly in accordance with the control. The correspondingly changed shape produces a predistortion that compensates for a distortion caused by the curvature of the windshield 31. According to a further variant, an optical pane (not shown here) of variable thickness or variable refractive index or a variable hologram, which are likewise suitable for producing a corresponding predistortion, is arranged for example on the mirror 51 or at another site of the beam path.

Figure 4:
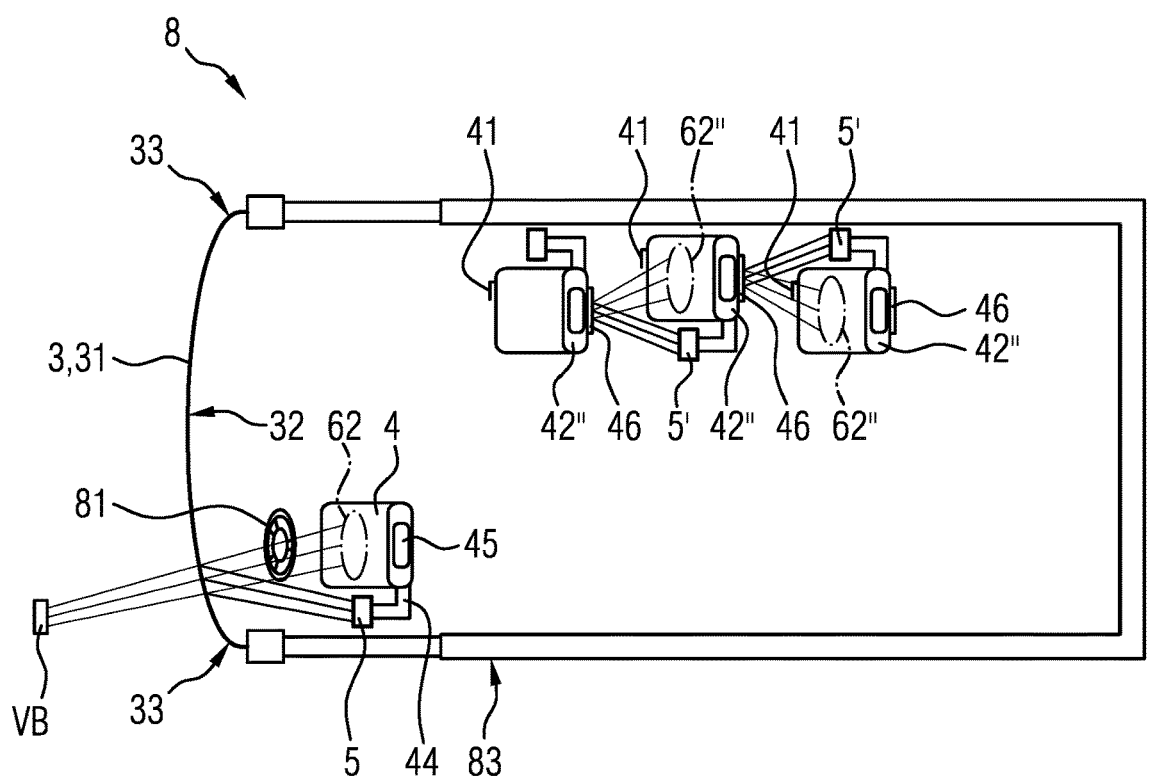
FIG. 4 shows a vehicle with head-up display system.

FIG. 4 shows a vehicle 8 with a head-up display system according to the invention in a schematic sectional plan view. It shows the partially reflecting transparent pane 3, the windshield 31 with its region 32 of uniform curvature and its regions 33 of variable curvature. The vehicle seat 4 is located behind the steering wheel 81 and the head-up display unit 5 is fastened to the headrest 45 by means of the fastening 44. It is arranged between the left outer side 83 of the vehicle 8 and the vehicle seat 4. It is thus laterally offset to the left from a user who sits on the vehicle seat 4. The beam path thus also has an angle of reflection greater than zero in plan view. The eyebox 62 is thus located at the center with reference to the vehicle seat 4. However, the user has to turn their gaze slightly to the left side in order to see the virtual image VB centrally.

In the rear region of the vehicle 8, further vehicle seats 4' are arranged, which have mirrors 46 on the rear side of their backrests 42" on which beams that are emitted by head-up display units 5' are reflected arrive in a corresponding eyebox 62". The vehicle seats 4' are laterally offset relative to one another, and the head-up display units 5' are arranged to be offset in accordance with the respective front seat, so that the angle of reflection, and thus the lateral offset of the virtual image VB, does not become too large.

Figure 5:
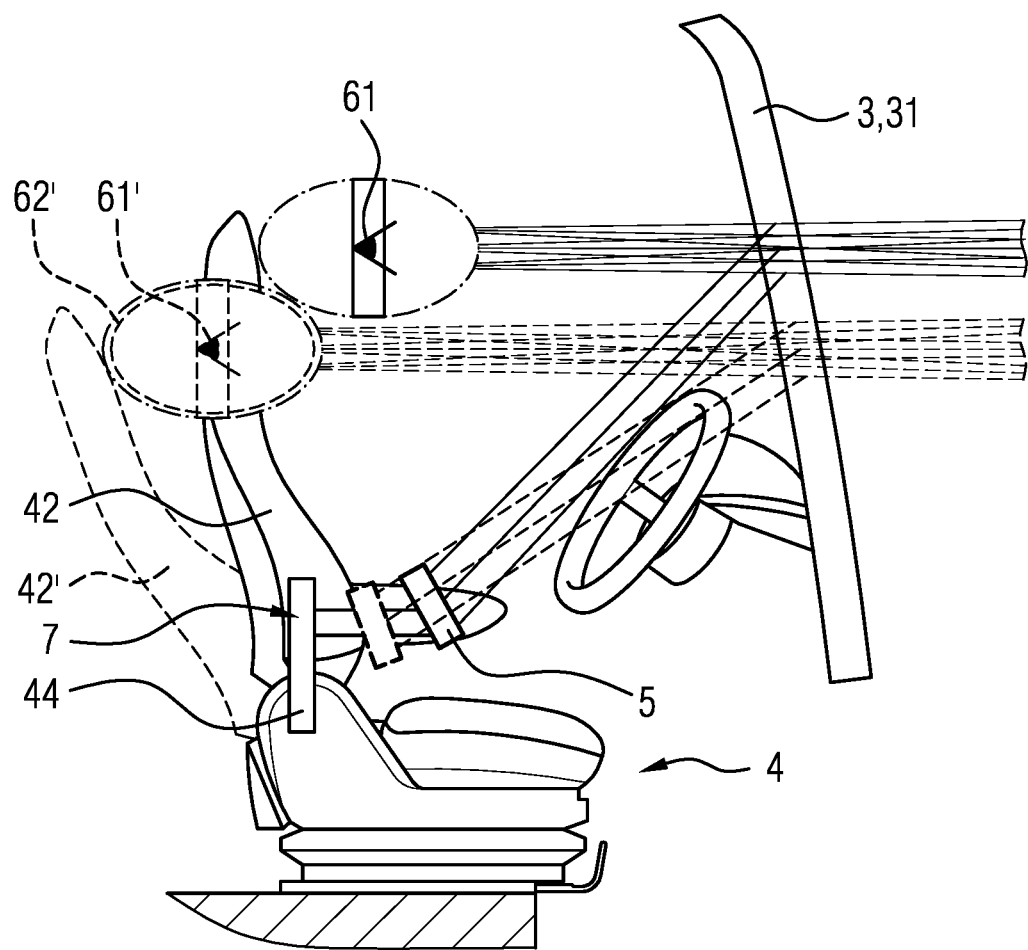
FIG. 5 shows a head-up display system with a seat inclination compensator.

FIG. 5 shows a head-up display system with a variant of a seat inclination compensator 7. The backrest 42 can be seen in its normal position and, drawn in dashed lines, the backrest 42' can be seen in a position which is inclined far back. The head-up display unit 5 is arranged here by means of the fastening 44 on a part of the vehicle seat 4 that is fixed with respect to the inclination of the backrest 42. The fastening 44 does not change its position if the inclination of the backrest 42 changes. However, the position of the eye 61 changes if the inclination changes. In that case, it is located as the eye 61' at a position that is offset downward and backward. A seat inclination compensator 7 located in the fastener 44 has means for detecting the inclination of the backrest 42.

Corresponding to the detected inclination, the seat inclination compensator 7 moves the head-up display unit 5 backward and tilts it in a manner such that the beams emitted by it are reflected at a lower position of the windshield 31 and thus the eyebox 62', which is illustrated in dashes here, is also in a lower position. Due to the horizontal backward displacement of the head-up display unit 5, the eyebox 62' is also displaced to the rear. The eye 61 is now again in an optimal position within the eyebox 62'.

The invention relates to head-up displays. These are generally rigidly attached in the vehicle 8 to the cross member below the windshield 31 and below the dashboard cover 82. The optical units 50 are typically developed specifically for given vehicle groups. The display in a head-up display system using the windshield 31 as a partially reflecting transparent pane 3 is generally designed for a small field of view of the driver, the eyebox 62, and is not designed for a greater head movement due to installation space limitations.

Owing to a large travel path of the vehicle seat 4, a conventional head-up display system and its projection unit would become very large and would take up too much installation space below the dashboard cover 82. Due to the up and down movement during driving operation, the location of the eyebox 62 relative to the fixed head-up display constantly changes. It follows that the representation also changes constantly. With a conventional head-up display system, the image would keep disappearing from the field of view. This results in decreased image performance and distraction of the driver due to the frequently disappearing and reappearing image. Furthermore, information is lost in the process. By connecting the head-up display unit 5, which is often also referred to as an imaging unit or PGU, to the seat, the location of the eyebox for displaying the head-up display system remains the same. This compensates for the negative influence during driving operation. This is useful in the case of trucks, buses, and other vehicles that have a fairly steep windshield 31.

Even when connecting the head-up display unit 5 to the body in the vicinity of the vehicle seat 4, the user can perceive in a large eyebox 62 a reflection of the head-up display unit 5, i.e. the virtual image VB, in the windshield. The image location relative to the user may be regulated by way of an active image adjustment. The adaptive solution proposed with the attachment of the head-up display unit 5 to the vehicle seat 4 can generally be used in a wide variety of applications. Possible fields of use are trucks, tractors, cranes, combine harvesters, trains, trams, aircraft, ships, forklifts, and other aircraft, watercraft, or terrestrial vehicles. Furthermore, any seat application can be used which brings information into a projection unit. Other examples are stationary work equipment such as water injection systems, separating machines, and machines with remote control, construction machines, work machines with rotating seats, control stands, tooling machines, and others.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A head-up display system for a motor vehicle comprising:
    a windshield which is a partially reflecting transparent pane with a region of nearly uniform curvature;
    a head-up display unit comprising a plane mirror, and a moveable mirror, wherein the head-up display unit generates light beams which are reflected by the plane mirror and moveable mirror to the windshield, and which are at least partially reflected by the windshield;
    a vehicle seat comprising a backrest, wherein the reflected light beams are directed toward an eye box that is located between the windshield and the vehicle seat;
    wherein the head-up display unit is attached to the vehicle seat with a fastener where the vehicle seat is fixed with respect to inclination of the backrest of the vehicle seat; and
    wherein a seat inclination compensator located in the fastener detects the inclination of the backrest.

2. The head-up display system as claimed in claim 1, wherein the head-up display unit has an image distorter that pre-distorts dependent upon on the adjustment of the vehicle seat.

3. The head-up display system as claimed in claim 1, wherein the system is configured for use in a vehicle, and the head-up display unit is arranged on the side of the vehicle seat that faces the outer side of the vehicle.

4. The head-up display system as claimed in claim 1, wherein a driver is located between the head-up display unit and the windshield.

5. A head-up display system for a motor vehicle comprising:
    a partially reflecting transparent pane with a region of nearly uniform curvature;
    a head-up display unit comprising a plane mirror, and a moveable mirror, wherein the head-up display unit generates light beams which are reflected by the plane mirror and moveable mirror to the partially reflecting transparent pane and which are at least partially reflected by the partially reflecting transparent pane; and
    a vehicle seat comprising a backrest,
    wherein the head-up display unit is attached to the vehicle seat with a fastener where the vehicle seat is fixed with respect to inclination of the backrest, wherein a seat inclination compensator located in the fastener detects the inclination of the backrest, and wherein the vehicle seat is facing toward the partially reflecting transparent pane.

6. The head-up display system as claimed in claim 5, wherein the head-up display unit has an image distorter that pre-distorts dependent upon the adjustment of the vehicle seat.

7. The head-up display system as claimed in claim 5, wherein the system is configured for use in a vehicle, and the head-up display unit is arranged on the side of the vehicle seat that faces the outer side of the vehicle.

* * * * *